(12) United States Patent
Eiza et al.

(10) Patent No.: US 7,859,762 B2
(45) Date of Patent: Dec. 28, 2010

(54) ABERRATION CORRECTION APPARATUS

(75) Inventors: Tsuyoshi Eiza, Osaka (JP); Shinya Shimizu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 447 days.

(21) Appl. No.: 11/987,669

(22) Filed: Dec. 3, 2007

(65) Prior Publication Data
US 2008/0212197 A1 Sep. 4, 2008

(30) Foreign Application Priority Data
Dec. 4, 2006 (JP) .............................. 2006-326497

(51) Int. Cl.
G02B 27/14 (2006.01)
G11B 7/135 (2006.01)
(52) U.S. Cl. .................... 359/637; 369/112.02
(58) Field of Classification Search .................. 359/637; 369/112.02
See application file for complete search history.

(56) References Cited

U.S. PATENT DOCUMENTS

| | | | |
|---|---|---|---|
| 2001/0033541 A1 | 10/2001 | Iwasaki et al. | |
| 2004/0125734 A1 | 7/2004 | Iwasaki et al. | |

FOREIGN PATENT DOCUMENTS

| | | |
|---|---|---|
| EP | 1843335 | 10/2007 |
| EP | 1843336 | 10/2007 |
| JP | 2001-176108 | 6/2001 |
| JP | 2001-273663 | 10/2001 |
| JP | 2003-141771 | 5/2003 |
| JP | 2005-302248 | 10/2005 |
| WO | WO-2006/092968 | 9/2006 |

*Primary Examiner*—Jack Dinh
(74) *Attorney, Agent, or Firm*—Morgan Lewis & Bockius LLP

(57) ABSTRACT

An aberration correction apparatus comprising a liquid crystal device which includes a first electrode layer that is formed with regions divided concentrically, a second electrode layer that is formed with regions divided concentrically, and a liquid crystal that is sandwiched in between the first electrode layer and the second electrode layer, and which transmits an incident light beam therethrough, an objective lens which condenses the light beam transmitted through the liquid crystal device, and a liquid-crystal-device drive circuit which drives the liquid crystal device, wherein the liquid-crystal-device drive circuit impresses a potential which belongs to a predetermined region included in a liquid crystal characteristic that is a relationship between potentials impressed on the respective electrode layers sandwiching in the liquid crystal therebetween and a phase change magnitude of the light beam transmitted through the liquid crystal, on the concentric regions formed in the first electrode layer, and it impresses a potential which belongs to a region included in the liquid crystal characteristic and exhibiting a smaller phase change magnitude per unit drive voltage than in the predetermined region, on the concentric regions formed in the second electrode layer, whereby an aberration of the light beam is corrected.

2 Claims, 5 Drawing Sheets

ABERRATION CORRECTION APPARATUS

This application is based on Japanese Patent Application No. 2006-326497 filed on Dec. 4, 2006, the contents of which are hereby incorporated by reference.

BACKGROUND OF THE INVENTION

1. Field of the Invention

The present invention relates to an aberration correction apparatus.

2. Description of the Related Art

At present, optical disks such as CDs and DVDs have spread and have come into general use. In addition, researches on the higher density of the optical disk have been made, and an optical disk heightened in density, such as Blu-ray Disk (hereinbelow, abbreviated to "BD"), has also been put into practical use.

In this regard, an optical pickup apparatus which plays back and records information for a plurality of sorts of optical disks with a single objective lens has been developed as an optical pickup which is installed in an optical disk apparatus. In case of coping with the plurality of sorts of optical disks with the single objective lens, even when the objective lens has been adjusted so that any aberration may not appear as to the optical disk of one sort by way of example, an aberration sometimes appears in the playback etc. of the information as to the optical disk of the other sort. Therefore, it is common to employ a configuration wherein a liquid crystal device is arranged in the optical pickup apparatus, and wherein a voltage is applied to the liquid crystal device so as to correct the aberration. In addition, regarding the liquid crystal device which is arranged for such a purpose, a type wherein regions divided concentrically are formed in both of two electrode layers included in the liquid crystal device and wherein potentials to be impressed on the respective divided regions are controlled, thereby to correct the aberration, has been introduced in large numbers in JP-A-2001-273663, and so forth.

The liquid crystal device of the above type, however, has the problem that, unless the potentials which are impressed on the respective divided regions formed in the electrode layers are appropriately controlled, the aberration correction cannot be made at a high precision.

SUMMARY OF THE INVENTION

The present invention has for its object to provide, in an aberration correction apparatus which includes a liquid crystal device that has two electrode layers each being formed with regions divided concentrically, an aberration correction apparatus which permits the correction of an aberration at a high precision.

In order to accomplish the object, an aberration correction apparatus according to the invention comprises:

a liquid crystal device which includes a first electrode layer that is formed with regions divided concentrically, a second electrode layer that is formed with regions divided concentrically, and a liquid crystal that is sandwiched in between the first electrode layer and the second electrode layer, and which transmits an incident light beam therethrough;

an objective lens which condenses the light beam transmitted through the liquid crystal device; and a liquid-crystal-device drive circuit which drives the liquid crystal device;

wherein the liquid-crystal-device drive circuit impresses a potential which belongs to a predetermined region included in a liquid crystal characteristic that is a relationship between potentials impressed on the respective electrode layers sandwiching in the liquid crystal therebetween and a phase change magnitude of the light beam transmitted through the liquid crystal, on the concentric regions formed in the first electrode layer, and it impresses a potential which belongs to a region included in the liquid crystal characteristic and exhibiting a smaller phase change magnitude per unit drive voltage than in the predetermined region, on the concentric regions formed in the second electrode layer, whereby an aberration of the light beam is corrected.

According to such a configuration, the phase change magnitude of the light beam which is transmitted through the liquid crystal device can be brought near to an aberration which appears before the correction, as far as possible, and the aberration can be corrected at a high precision.

Besides, in the above configuration, the number of the concentric regions which are formed in the second electrode layer should desirably be made larger than the number of the concentric regions which are formed in the first electrode layer. According to such a configuration, the potential which is set for the second electrode layer can be set more finely, and the aberration can be corrected at a higher precision.

DESCRIPTION OF THE PREFERRED EMBODIMENTS

Now, embodiments of the present invention will be described with reference to the drawings.

Figure 1:
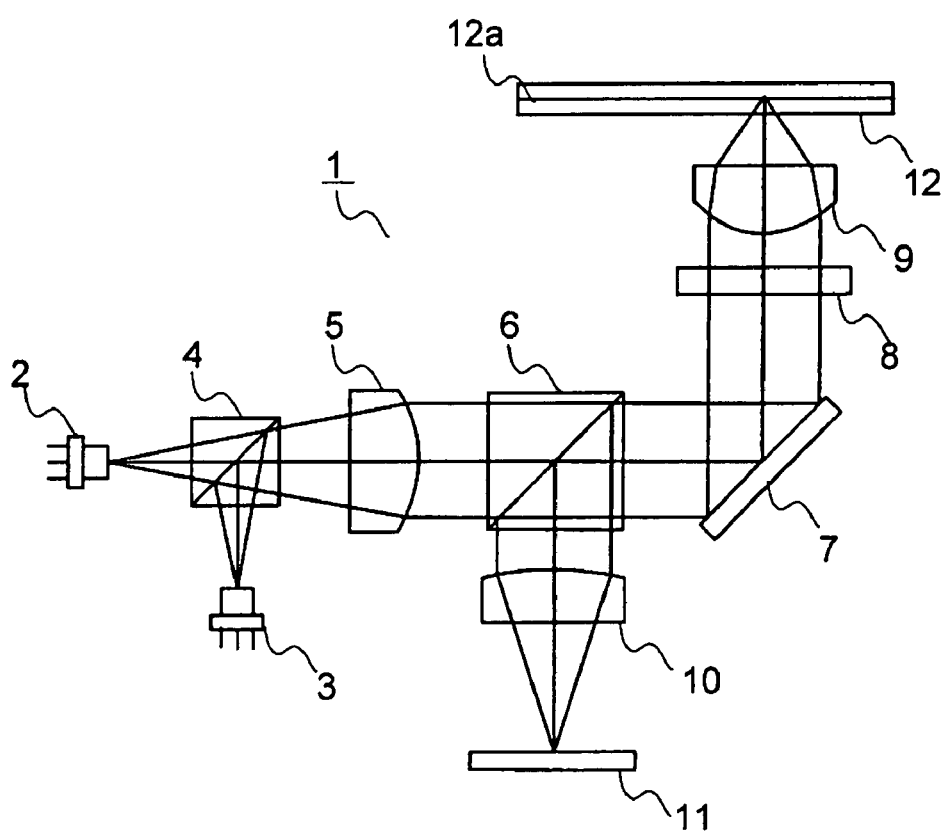
FIG. 1 is a schematic diagram showing the optical system of an optical pickup according to the present invention.

FIG. 1 is a schematic diagram showing the optical system of an optical pickup 1 according to the invention as is installed in an optical disk apparatus. The optical pickup 1 includes a first light source 2, a second light source 3, a dichroic prism 4, a collimate lens 5, a beam splitter 6, a startup mirror 7, a liquid crystal device 8, an objective lens 9, a detection lens 10 and a photodetector 11.

The first light source 2 is a semiconductor laser which can emit a light beam of 650 nm band corresponding to a DVD, while the second light source 3 is a semiconductor laser which can emit a light beam of 405 nm band corresponding to a BD.

The dichroic prism 4 transmits therethrough the light beam which is emitted from the first light source 2 for emitting the light beam for the DVD, and it reflects therefrom the light beam which is emitted from the second light source 3 for emitting the light beam for the BD. In addition, the dichroic prism 4 brings the optic axes of the light beams emitted from the first light source 2 and the second light source 3, into agreement. The light beam transmitted through or reflected from the dichroic mirror 4 is conveyed to the collimate lens 5.

The collimate lens 5 converts the light beam having passed through the dichroic prism 4, into parallel light. Here, the expression "parallel light" signifies light in which all the optical paths of the light beam emitted from the first light source 2 or the second light source 3 are substantially parallel to the optic axis. The light beam converted into the parallel light by the collimate lens 5 is conveyed to the beam splitter 6.

The beam splitter 6 transmits therethrough the light beam conveyed from the collimate lens 5, so as to guide the transmitted light beam onto the side of an optical disk 12, and it reflects reflection light from the optical disk 12, so as to guide the reflected light onto the side of the photodetector 11. The light beam transmitted through the beam splitter 6 is conveyed to the startup mirror 7.

The startup mirror 7 reflects the light beam transmitted through the beam splitter 6, and guides the reflected light beam toward the optical disk 12. The light beam reflected from the startup mirror 7 is conveyed to the liquid crystal device 8.

The liquid crystal device 8 is a device which permits the control of the phase of the light beam that is transmitted through this liquid crystal device 8, by utilizing the property that, when a voltage is applied to a liquid crystal sandwiched in between electrode layers, the molecules of the liquid crystal change their orientation direction. Owing to the arrangement of the liquid crystal device 8, it becomes possible to correct an aberration which occurs due to the difference of the thickness of a protective layer for protecting the record surface 12a of the optical disk 12, and so forth. In this embodiment, the correction of the aberration is possible as to the light beam which is emitted from the light source for the DVD (the first light source 2). Incidentally, the details of the liquid crystal device 8 will be stated later. The light beam having passed through the liquid crystal device 8 is conveyed to the objective lens 9.

The objective lens 9 condenses the light beam transmitted through the liquid crystal device 8, onto the record surface 12a of the optical disk 12. The objective lens 9 in this embodiment is designed so as not to give rise to any aberration, as to the light beam which is emitted from the light source for the BD (the second light source 3). In this case, the light beam, which is emitted from the light source for the DVD (the first light source 2) and which is then transmitted through the objective lens 9, undergoes the aberration. Therefore, the liquid crystal device 8 is arranged in the optical system of the optical pickup 1, whereby the aberration can be corrected. Besides, the objective lens 9 is made movable in, for example, up and down directions and right and left directions in FIG. 1, by an objective lens actuator not shown, whereby the position thereof is controlled on the basis of a focus servo signal and a tracking servo signal. Besides, the liquid crystal device 8 is also mounted on the objective lens actuator so as to be movable with the objective lens 9.

The reflection light reflected from the optical disk 12 is passed through the objective lens 9 and the liquid crystal device 8 in this order, and is reflected from the startup mirror 7. Thereafter, the reflection light is further reflected from the beam splitter 6, and it is condensed onto a light receiving portion provided in the photodetector 11, by the detection lens 10.

The photodetector 11 converts received light information into an electric signal and outputs the electric signal to, for example, an RF amplifier not shown, thereby to generate the playback signal of data recorded on the record surface 12a, and the focus servo signal and the tracking servo signal.

Figure 2:
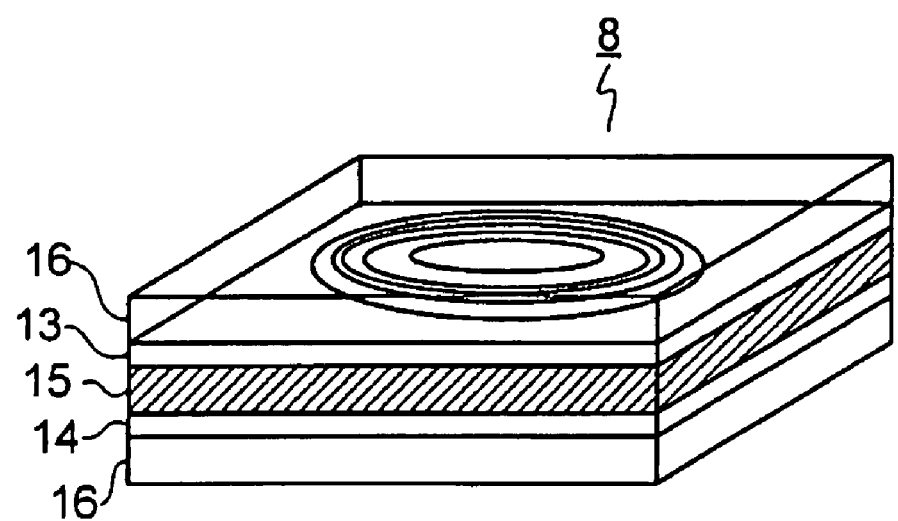
FIG. 2 is a schematic perspective view showing the structure of a liquid crystal device.

Here, FIG. 2 shows a schematic perspective view illustrating the structure of the liquid crystal device 8. The liquid crystal device 8 includes a liquid crystal 15, a first electrode layer 13 and a second electrode layer 14 between which the liquid crystal 15 is sandwiched in, and two glass plates 16 between which a portion configured of the liquid crystal 15, the first electrode layer 13 and the second electrode layer 14 is sandwiched in. Each of the first electrode layer 13 and the second electrode layer 14 is formed with regions divided concentrically, and the number of the regions formed in the second electrode layer 14 is larger than the number of the regions formed in the first electrode layer 13.

Besides, the individual regions formed in the first electrode layer 13 and the second electrode layer 14 are electrically connected with a liquid-crystal-device drive circuit not shown. The liquid-crystal-device drive circuit may be disposed in the optical pickup 1, or may well be disposed in the optical disk apparatus outside the optical pickup 1. The light beam reflected from the startup mirror 7 is transmitted through the glass plate 16, the first electrode layer 13, the liquid crystal 15, the second electrode layer 14 and the glass plate 16 in the order mentioned, whereupon it enters the objective lens 9.

Next, a method for driving the liquid crystal device 8 will be described.

Figure 3:
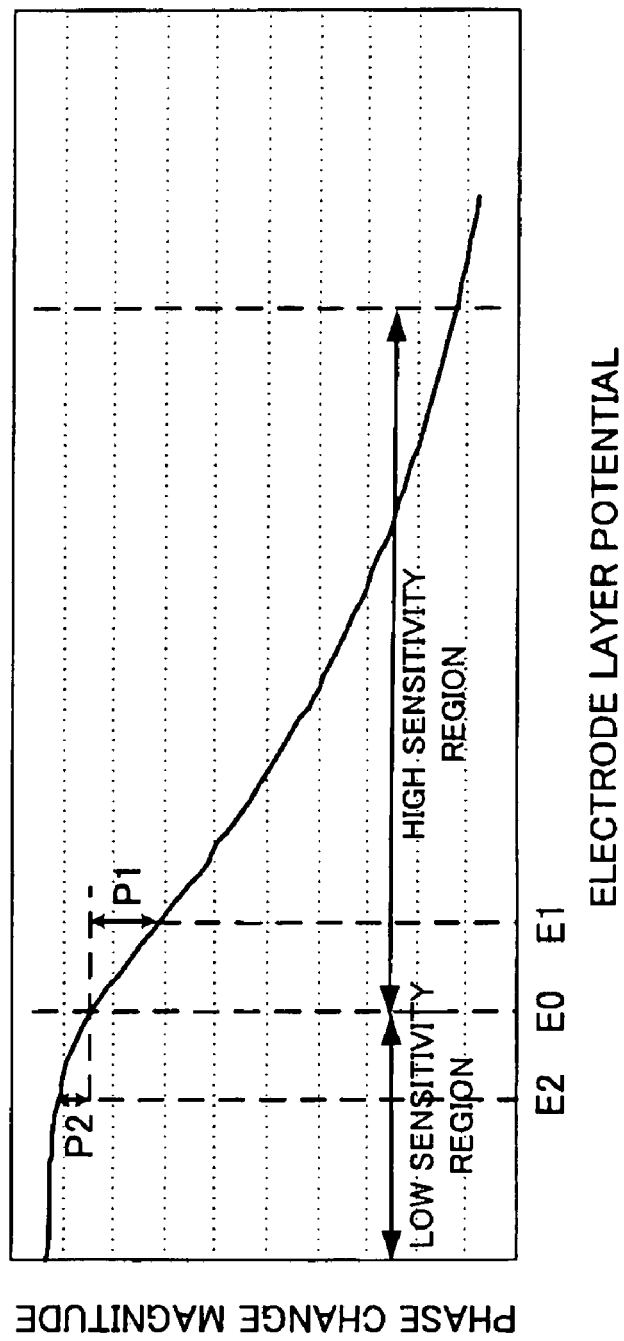
FIG. 3 is a graph showing a liquid crystal characteristic.

FIG. 3 shows a liquid crystal characteristic which is the relationship between potentials that are impressed on the respective electrode layers sandwiching in the liquid crystal therebetween and the phase change magnitude of the light beam that is transmitted through the liquid crystal. In a case where the potential of a certain point on the axis of abscissas in FIG. 3 is impressed on one of the two electrodes and where the potential of another point on the axis of abscissas in FIG. 3 is impressed on the other electrode, the phase of the light beam which is transmitted through the liquid crystal is changed by the phase change magnitude which corresponds to the distance in the direction of the axis of ordinates between individual points on a curve in FIG. 3 as correspond to the respective potentials.

The liquid crystal characteristic has a high sensitivity region being a region in which the phase change magnitude per unit drive voltage is large, and a low sensitivity region being a region in which the phase change magnitude per unit drive voltage is smaller than in the high sensitivity region. In the invention, the potential which belongs to the high sensitivity region is impressed on the regions formed in the first electrode layer 13 included in the liquid crystal device 8 by the liquid-crystal-device drive circuit, whereas the potential which belongs to the low sensitivity region is impressed on the regions formed in the second electrode layer 14 included in the liquid crystal device 8 by the liquid-crystal-device drive circuit.

Figure 4A:
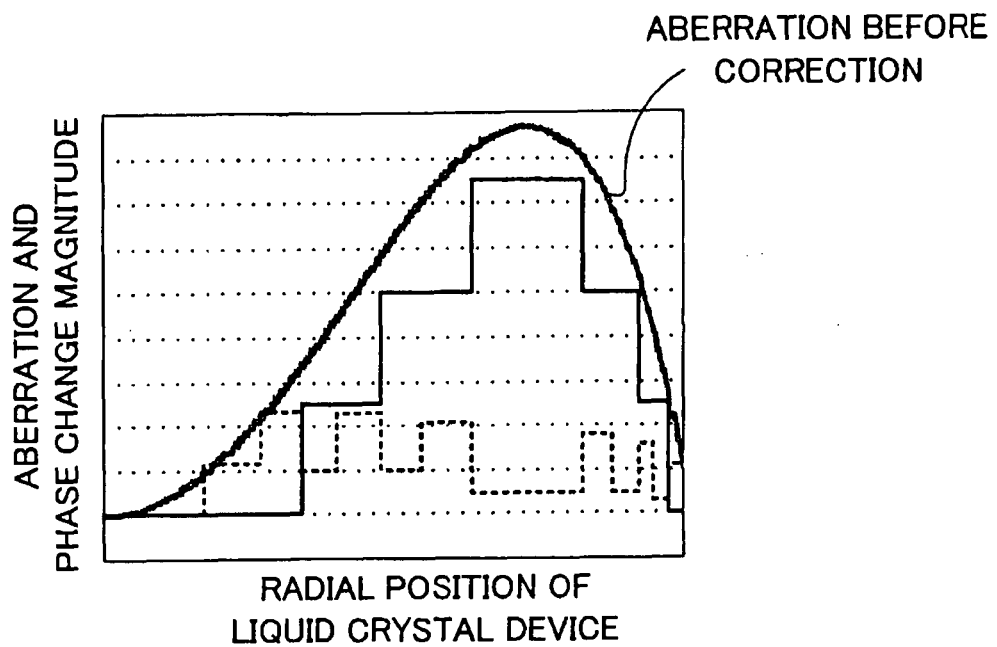
FIG. 4A is a diagram showing a method for driving the liquid crystal device according to the invention.

A fine solid line in FIG. 4A indicates every region, the phase change magnitude (P1 in FIG. 3) which corresponds to a potential difference from a reference potential (E0 in FIG. 3) at the boundary between the high sensitivity region and the low sensitivity region, as regards the potential (E1 in FIG. 3) which belongs to the high sensitivity region and which is impressed on the regions formed in the first electrode layer 13. Besides, a fine dotted line in FIG. 4A indicates every region, the phase change magnitude (P2 in FIG. 3) which corresponds to a potential difference from the reference potential (E0 in FIG. 3), as regards the potential (E2 in FIG. 3) which belongs to the low sensitivity region and which is impressed on the regions formed in the second electrode layer 14. Besides, a bold solid line in FIG. 4A indicates an aberration which appears before the correction based on the liquid crystal device 8.

Figure 4B:
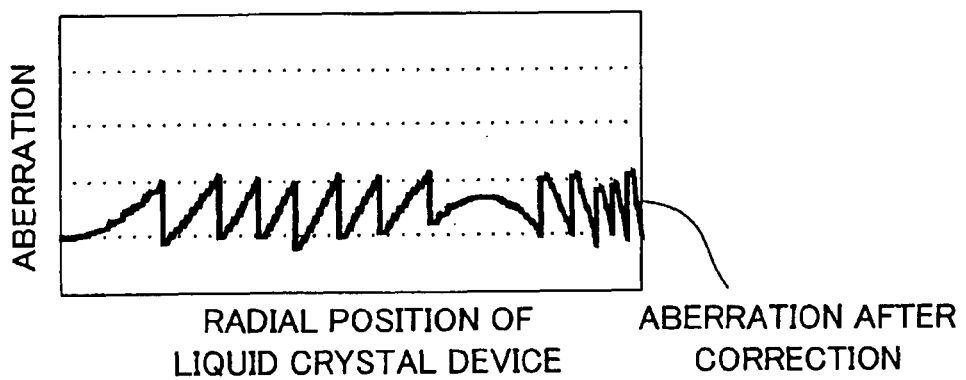
FIG. 4B is a diagram showing an aberration correction result based on the method for driving the liquid crystal device according to the invention.

The sum between the phase change magnitude corresponding to the first electrode layer 13 and the phase change magnitude corresponding to the second electrode layer 14 (that is, the sum between the fine solid line and the fine dotted line in FIG. 4A) becomes the phase change magnitude of the light beam which is transmitted through the liquid crystal device 8, and the difference between this sum and the aberration which appears before the correction becomes an aberration after the correction. FIG. 4B shows the aberration after the correction. In the invention, since the potential belonging to the low sensitivity region is impressed on the regions formed in the second electrode layer 14, the sum of the phase change magnitudes can be brought near to the aberration appearing before the correction, as far as possible, and the aberration after the correction can be made small as shown in FIG. 4B. Thus, the shape of a light beam spot which is formed by the condensation based on the objective lens 9 becomes favorable, and record and playback performances are enhanced.

Moreover, since the number of the regions which are formed in the second electrode layer 14 is made larger than the number of the regions which are formed in the first electrode layer 13, the potential which is set for the second electrode layer 14 can be set more finely, and the correction of the aberration can be made at a higher precision.

Incidentally, for the sake of a comparison with the invention, there will now be explained a case where potentials belonging to the high sensitivity region are impressed on both the regions formed in the first electrode layer 13 and the regions formed in the second electrode layer 14.

Figure 4C:
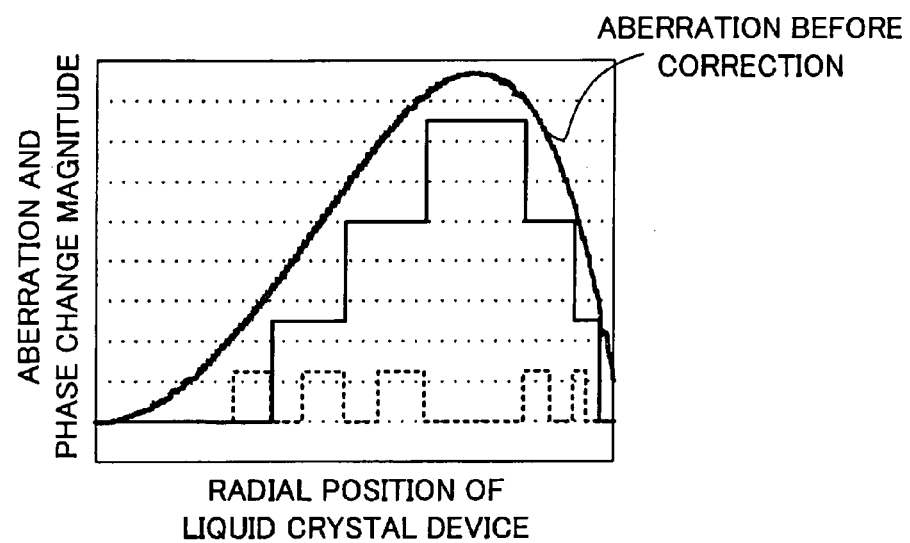
FIG. 4C is a diagram showing a method for driving the liquid crystal device as is a comparative example to the invention.

A fine solid line in FIG. 4C indicates every region, the phase change magnitude which corresponds to a potential difference from a reference potential belonging to the high sensitivity region, as regards the potential which belongs to the high sensitivity region and which is impressed on the regions formed in the first electrode layer 13. Besides, a fine dotted line in FIG. 4C indicates every region, the phase change magnitude which corresponds to a potential difference from the reference potential, as regards the potential which belongs to the high sensitivity region and which is impressed on the regions formed in the second electrode layer 14. Besides, a bold solid line in FIG. 4C indicates an aberration which appears before the correction based on the liquid crystal device 8.

Figure 4D:
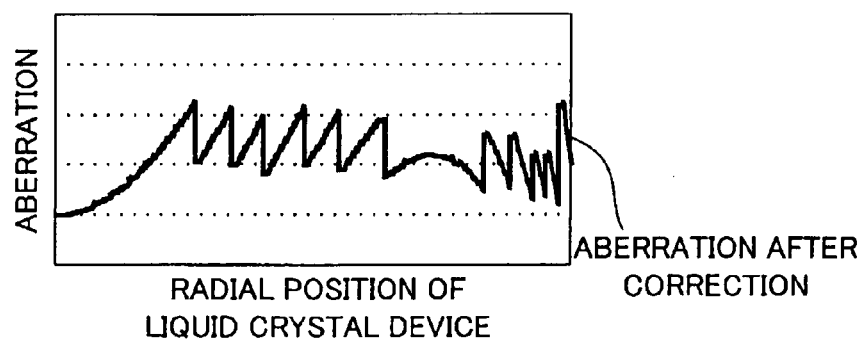
FIG. 4D is a diagram showing an aberration correction result based on the method for driving the liquid crystal device as is the comparative example to the invention.

The sum between the phase change magnitude corresponding to the first electrode layer 13 and the phase change magnitude corresponding to the second electrode layer 14 (that is, the sum between the fine solid line and the fine dotted line in FIG. 4C) becomes the phase change magnitude of the light beam which is transmitted through the liquid crystal device 8, and the difference between this sum and the aberration which appears before the correction becomes an aberration after the correction. FIG. 4D shows the aberration after the correction. In this case, since the potential belonging to the high sensitivity region is impressed also on the second electrode layer 14, it is difficult to bring the sum of the phase change magnitudes near to the aberration which appears before the correction, and the aberration after the correction becomes large as shown in FIG. 4D. The superiority of the invention can be seen by comparing FIG. 4B referred to before, with FIG. 4D.

What is claimed is:

1. An aberration correction apparatus comprising:
    a liquid crystal device which includes a first electrode layer that is formed with regions divided concentrically, a second electrode layer that is formed with regions divided concentrically, and a liquid crystal that is sandwiched in between the first electrode layer and the second electrode layer, and which transmits an incident light beam therethrough;
    an objective lens which condenses the light beam transmitted through the liquid crystal device; and
    a liquid-crystal-device drive circuit which drives the liquid crystal device;
    wherein
    the liquid-crystal-device drive circuit impresses a potential which belongs to a predetermined region included in a liquid crystal characteristic that is a relationship between potentials impressed on the respective electrode layers sandwiching in the liquid crystal therebetween and a phase change magnitude of the light beam transmitted through the liquid crystal, on the concentric regions formed in the first electrode layer, the liquid crystal characteristic being such that, where a potential of a certain point on an axis of abscissas is impressed on one of the two electrode layers and where a potential of another point on the axis of abscissas is impressed on the other electrode layer, a phase of the light beam transmitted through the liquid crystal is changed by a phase change magnitude corresponding to a distance in a direction of an axis of ordinates between individual points on a characteristic curve corresponding to the respective potentials, and
    the liquid-crystal-device drive circuit impresses a potential which belongs to a region included in the liquid crystal characteristic and exhibiting a smaller phase change magnitude per unit drive voltage than in the predetermined region, on the concentric regions formed in the second electrode layer, whereby an aberration of the light beam is corrected.

2. An aberration correction apparatus according to claim 1, wherein the number of the concentric regions which are formed in the second electrode layer is larger than the number of the concentric regions which are formed in the first electrode layer.

* * * * *